Patented Feb. 4, 1947

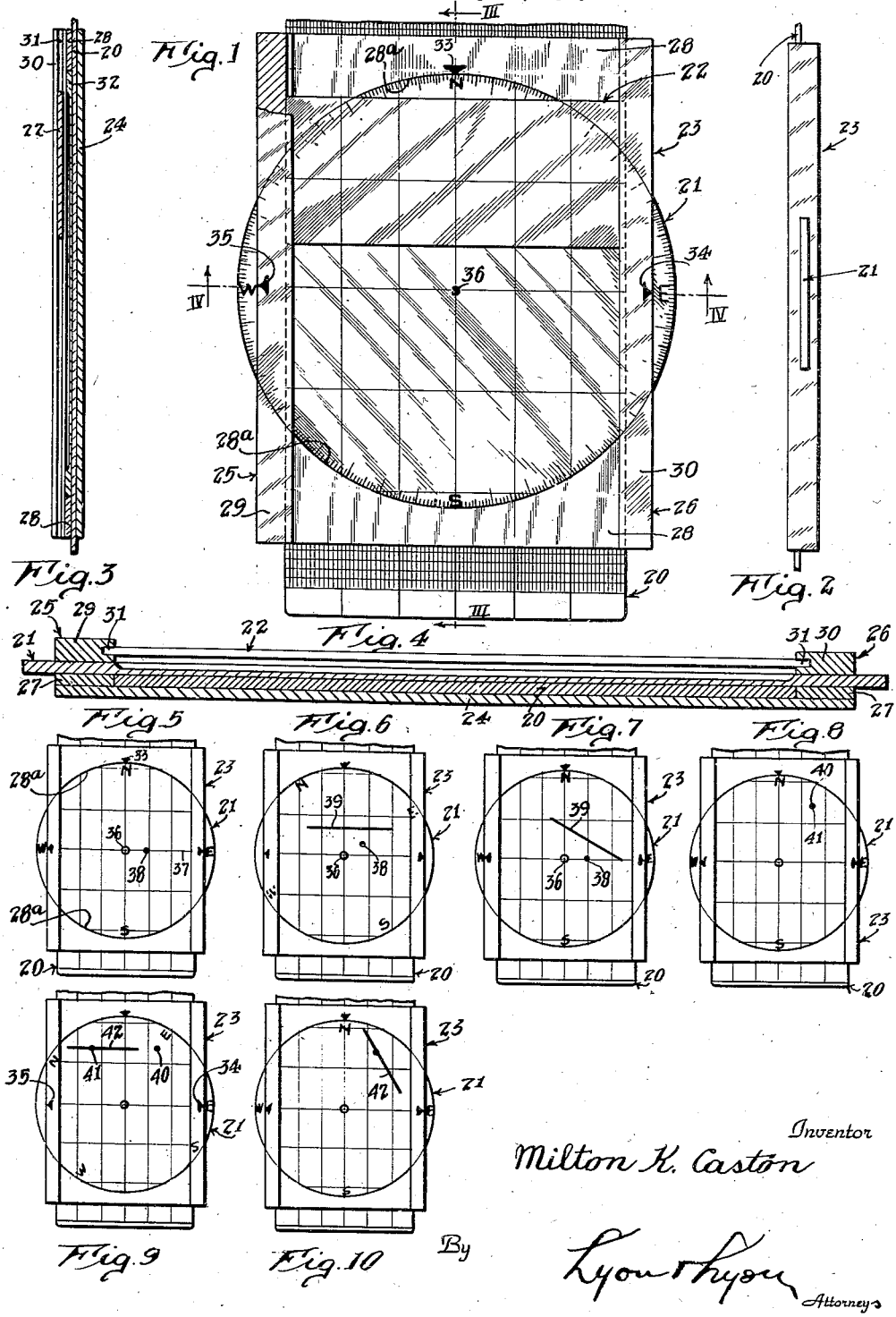

2,415,277

UNITED STATES PATENT OFFICE 2,415,277

PLOTTING DEVICE

Milton K. Caston, Long Beach, Calif.

Application July 16, 1943, Serial No. 494,995

5 Claims. (Cl. 33—80)

This invention relates to navigation and particularly to the plotting on a chart or map of lines of position.

An object of the invention is to provide a simple and effective device for rapidly plotting a line of position.

Another object is to provide a compact device for plotting lines of position.

In plotting a line of position on a chart, either from data obtained by observing a celestial body or from taking a radio bearing, it has been customary to employ a chart of appreciable size mounted on a plotting board and to draw the line of position on the chart with the aid of tools such as straight edges, protractors, parallel rulers, etc. These methods are quite satisfactory where there is sufficient room for the relatively bulky equipment. Unfortunately, however, in some airplanes it is quite difficult to find sufficient space in which to use the conventional plotting board and its accessories. Furthermore it is rather difficult to employ them when the user must at the same time pilot the airplane, as is sometimes the case.

In accordance with the present invention, I substitute for the conventional plotting board and its accessories a compact instrument which is substantially flat and measures only a few inches in each lateral direction. Briefly, the device comprises a frame for slidably supporting a chart card covering only a relatively small area. It is possible with my invention to employ small charts because a plurality of such charts capable of being stacked in a deck can be provided to cover the course of a flight and successive cards inserted in the frame as the airplane moves along its course. The frame, in addition to slidably supporting a card chart, rotatably supports a transparent disc positioned against the upper surface of the chart, and slidably supports a straight edge above the disc. Because of the transparency of the disc, the chart can be observed therethrough. In practice, the line of position is drawn on the disc, which is provided with a surface capable of readily taking a pencil mark, instead of on the chart. The drawing of the line of position on the disc is made easy because of the fact that the disc is rotatable with respect to the chart and the straight edge and is provided with an azimuth rose on its edge so that it can be rotated through an angle corresponding to the direction of the line of position and the latter drawn thereon with the aid of the straight edge. Thereafter, when the disc is rotated back to normal position, the line of position drawn thereon appears in the proper position, and extends in the proper direction, with respect to the chart therebelow.

A complete understanding of the invention, together with various specific objects and features thereof, will become apparent from the following description taken in connection with the drawing, in which:

Fig. 1 is a face view of an instrument in accordance with the invention;

Fig. 2 is a side edge view thereof;

Fig. 3 is a longitudinal section taken along the line III—III of Fig. 1;

Fig. 4 is a cross section thereof taken in the plane IV—IV of Fig. 1; and

Figs. 5 to 10, inclusive, are schematic diagrams illustrating the manner of using the device.

Referring first to Figs. 1 to 4, inclusive, my plotting device comprises as its essential elements a chart card 20, a disc 21, a straight edge 22 and a frame 23 for supporting the card, disc and straight edge in suitable relation with respect to each other.

Thus, the frame 23 comprises a rear wall 24 to which are secured a pair of identical side members 25 and 26, respectively. These side members 25 and 26 may include as a part thereof a lower strip 27 secured directly to the front face of the rear wall 24 and of the same thickness as the chart card 20. The strips 27 serve as spacers between the rear wall 24 and a pair of intermediate walls 28, which intermediate walls are of the same thickness as the disc 21 and have arcuate inner edges 28a slidably contacting the peripheral edge of the disc to guide it in its rotary movement. The intermediate wall members 28 are surmounted by side strips 29 and 30 which are rabbeted on their inner edges as indicated at 31 to slidably support the straight edge 22.

Various materials may be employed in the construction of the device but I have found it feasible to form all the parts so far mentioned from plastic material, at least the disc 21 and the straight edge 22 being of transparent plastic. The different parts may be cemented or joined together in any desired manner.

The disc 21 is provided with an azimuth scale 32 on its periphery and cooperating index marks are provided on the frame. Thus a top index mark 33 is provided on the upper member 23, which index is normally juxtaposed to the end N. (north) point on the azimuth scale. A second index mark 34 is provided on the frame strip 29, this index mark being normally opposite the E. (east) point on the azimuth scale. Although it is not essential, a third index 35 may be provided on the strip 29, this index being normally juxtaposed to the W. (west) point on the azimuth scale. The disc 21 can be readily rotated by virtue of the fact that it projects slightly beyond the side frame members 25 and 26 so that it can be engaged by the fingers at those points. A center hole 36 is provided in the disc.

It will be apparent that the chart card 20 is slidable longitudinally in the frame, and the straight edge 22 is likewise slidable longitudinally in the frame. Therefore, both the chart and the straight edge are linearly adjustable with respect to the disc and the disc is rotatable with respect to both the straight edge and the chart card. Two ways in which the device can be employed to chart lines of position will now be described with reference to Figs. 5 to 10, inclusive.

The plotting of a line of position from data obtained by an observation on a celestial body will first be described with reference to Figs. 5, 6 and 7. It is unnecessary to an understanding of the present invention to go into the details of taking an observation. Suffice it to say that one obtains from the celestial observation and from the computations involving use of navigation tables three values which are used in connection with my device to draw a line of position on the disc 21 which will be properly positioned on the chart card 20, assuming, of course, that the particular chart card inserted in the device covers the location of the craft at the time of the observation. These three quantities are: (1) the assumed or dead reckoning position; (2) the intercept or difference, in minutes of arc, between the computed altitude of the observed body for the assumed position and the observed altitude; and (3) the azimuth of the observed body.

The device is manipulated as follows: With the disc in normal position, i. e. with the N point thereon juxtaposed to the index 33, the chart card 20 is slid up or down in the frame to bring the latitude parallel 37 of the assumed position exactly under the center hole 36 in the disc 21, and a pencil mark 38 is made on the upper surface of the disc at a point thereon overlying the assumed position on the chart card 20. The disc 21 is next rotated until the angle thereon corresponding to the azimuth of the observed body is juxtaposed to the index 33, as shown in Fig. 6. In this particular instance it is assumed that the azimuth is 30°, and it will be observed that in Fig. 6 the disc 21 has been rotated counterclockwise through 30°. The next step is to measure the intercept from the point 38, and position the straight edge 22 (Fig. 1) so that one of its edges (usually the upper edge) is spaced the distance of the intercept above the mark 38. This distance can be readily determined, without the use of a separate scale, from the subdivisions of latitude on the chart 20, the space between each adjacent pair of parallels of latitude being subdivided into twelve divisions, each representing a distance of five minutes of latitude or five nautical miles. When the straight edge has been positioned in the manner described, a line 39 is drawn along its edge on the disc 21. The disc is next restored to normal position, as shown in Fig. 7, which carries the mark 38 back into its original position relative to the chart as shown in Fig. 5. It likewise moves the line 39 relative to the chart, and the line then constitutes the line of position which was desired.

Obviously by repeating the procedure with data from other observations another line or lines of position may be drawn so that the intersection of the lines of position gives a fix (the true position of the craft).

The procedure is very similar in plotting a line of position from a radio bearing, which will now be explained with reference to Figs. 8, 9 and 10. It will be assumed that the radio station on which a bearing is taken has its position indicated on the chart card at 40 from its known longitude and latitude. With the disc 21 in normal position, a pencil mark 41 is made on the disc immediately above the mark 40. Next, the disc is rotated until the point on the azimuth scale on the disc corresponding to the true radio bearing, as determined from the radio compass, is opposite one of the side indexes 34 or 35. In Fig. 9 the disc has been rotated to bring the bearing angle on the azimuth scale opposite the index 34. This shifts the mark 41 on the disc away from the mark 40 on the chart an angular distance equal to the bearing angle. The straight edge 22 is then shifted to bring one of its edges to the mark 41 and a straight line 42 is drawn through the point 41. When the disc is then rotated back to normal position, as shown in Fig. 10, the line 42 is properly positioned with respect to the chart to constitute the true bearing line from the craft to the radio station. Obviously two or more lines may be drawn by taking bearings on other radio stations to obtain a radio fix.

Of course, the charts on the chart cards 20 are Mercator projections and each deck of cards includes a series of charts beginning from a few degrees on one side of the equator and extending to approximately 60° latitude. The parallels of latitude are, of course, appropriately identified. However, the longitude meridians are not marked because they are parallel and equidistant and, therefore, can be given any longitudinal designation desired. By turning the cards upside down, the same set of cards will cover latitudes in the opposite hemisphere. For any particular air route, a set of charts can be specifically set up and used.

One advantage of the apparatus described is that the charts are kept clean, all marks being made on the rotatable disc. Hence the same chart cards can be used for a long period of time.

By virtue of its compactness, my device can be easily employed by an airplane pilot while he is piloting the airplane.

As clearly shown in Figs. 3 and 4, the disc 21 is made relatively thin over its main area but is thicker at the rim. Although not essential, this construction is desirable because it provides strength and bearing surface at the rim without objectionable thickness over the area where the marks are made. Excessive thickness in this area would be objectionable because it would increase the distance between the surface of the chart and the upper surface of the disc where the marks are made, thereby increasing the likelihood of error resulting from parallax.

Although the straight edge 22 is desirable since it facilitates the rapid drawing of straight lines parallel to the latitude lines on the chart card, it is not absolutely essential and it may be desirable in some instances to omit it. Thus, it is possible to draw fairly accurate lines without the straight edge by following the closest latitude lines on the chart 20.

Although for the purpose of explaining the invention one specific embodiment of it has been described in detail, it is to be understood that various departures from the exact construction shown can be made without departing from the invention, which is to be limited only to the extent set forth in the appended claims.

I claim:

1. A plotting instrument for obtaining a line of position comprising: a chart member bearing a Mercator chart having identified parallels of latitude and having meridians of longitude, a circular transparent member overlying said chart member and having a mark-receiving surface, means engageable with opposite margins of said chart member and with the periphery of said transparent member for guidingly supporting said two members for relative linear movement having a component parallel to the meridians on said chart, and for relative angular movement about a fixed point on said transparent member, and angle-indicating means for indicating the relative angular positions of said members.

2. A plotting instrument for obtaining a line of position comprising: a chart member bearing a Mercator chart having identified parallels of latitude and having meridians of longitude, a circular transparent member overlying said chart member and having a mark-receiving surface, means engageable with opposite margins of said chart member and with the periphery of said transparent member for guidingly supporting said two members for relative linear movement having a component parallel to the meridians on said chart, and for relative angular movement about a fixed point on said transparent member, angle-indicating means for indicating the relative angular positions of said members, ruling means overlying said transparent member for facilitating the drawing of straight lines thereon, and means guidingly supporting said ruling means for translatory movement with respect to said members, said translatory movement having a component parallel to said meridians.

3. A navigation plotting device, comprising: a Mercator chart card, a transparent azimuth disk having a central mark-receiving upper surface, and a peripheral compass rose thereon; a transparent ruling plate, a holder structure including individual guide means for slidably receiving said card and plate, and journal means coacting with the periphery of said disk for rotatably guiding said disk between said card and plate.

4. A navigation plotting device, comprising: a holder structure including a back member and a pair of side flanges along opposite margins of said back member, said side flanges having lateral slots therein occupying a common plane parallel to said means along their confronting sides in front of and in back of said slots; a transparent circular disk having a writing surface journaled by its periphery in said slots, a Mercator chart card slidable in the guide means in back of said disk, and a transparent ruling plate slidable in the guide means in front of said disk.

5. A navigation plotting device, comprising: a transparent circular disk having a peripheral azimuth rose and a writing surface within said rose; a chart card slidable across the under side of said disk, a ruling device slidable over the upper side of said disk, and a holder structure journaling said disk by its periphery and slidably supporting said chart card and ruling device.

MILTON K. CASTON.

REFERENCES CITED

The following references are of record in the file of this patent:

UNITED STATES PATENTS

| Number | Name | Date |
|---|---|---|
| 1,580,419 | De Marquez | Apr. 13, 1926 |
| 2,013,603 | Dalton | Sept. 3, 1935 |
| 2,007,986 | Sprague | July 16, 1935 |
| 2,309,930 | Byerly | Feb. 2, 1943 |
| 2,114,652 | Dalton | Apr. 19, 1938 |
| 1,154,673 | Van Ness | Sept. 28, 1915 |
| 2,109,065 | Haselton | Feb. 26, 1938 |
| 2,235,177 | Stark | Mar. 18, 1941 |
| 1,896,997 | Bennett | Feb. 7, 1933 |
| 2,244,181 | Wood | June 3, 1941 |

FOREIGN PATENTS

| Number | Country | Date |
|---|---|---|
| 476,568 | British | Dec. 6, 1937 |